April 20, 1954 J. W. DEHN 2,676,313

PULSE COUNTING RELAY SYSTEM

Filed Feb. 4, 1952 2 Sheets-Sheet 1

INVENTOR
J. W. DEHN
BY C. Mathie
ATTORNEY

SEQUENCE DIAGRAM

INVENTOR
J. W. DEHN
BY C. Mathieu
ATTORNEY

Patented Apr. 20, 1954

2,676,313

UNITED STATES PATENT OFFICE 2,676,313

PULSE COUNTING RELAY SYSTEM

Joseph W. Dehn, Great Neck, N. Y., assignor to Bell Telephone Laboratories, Incorporated, New York, N. Y., a corporation of New York Application February 4, 1952, Serial No. 269,815

7 Claims. (Cl. 340—168)

This invention relates to telephone systems and more particularly to means for receiving and counting dial pulses for the purpose of controlling the automatic establishment of telephone connections.

The use of relays for counting pulses is well known, the early circuits employing as many as twenty relays to count up to ten pulses, which is the maximum number generated by the standard telephone dial. From time to time various arrangements have been designed for the purpose of reducing the number of relays required, one arrangement which has found wide use employing nine relays. As the number of relays is reduced, the complexity of the circuits interconnecting them increases, and the contact arrangement on the individual relays and on the pulse receiving relay requires special design.

In accordance with the present invention a counting relay arrangement is provided for counting ten pulses and also indicating a normal and an overflow condition, this arrangement requiring only six relays, all of which, as well as the pulse receiving relay, have only simple make and break contacts. The relay network comprises two binary counters and two marking relays, one binary counter and the two marking relays being operated in various combinations to register the number of pulses received, while the other binary counter responds once per pulse and drives the actual counter.

Specifically, a feature of the invention lies in the circuit arrangement for operating the last-mentioned binary counter from a pulse receiving relay having only make and break contacts. Each relay of the pair is operated over one contact of the pulse receiving relay, locks over the other contact of the pulse receiving relay and is provided with a supplementary locking circuit effective during the time that the armature of the pulse receiving relay is moving between its two contacts.

Figure 1:
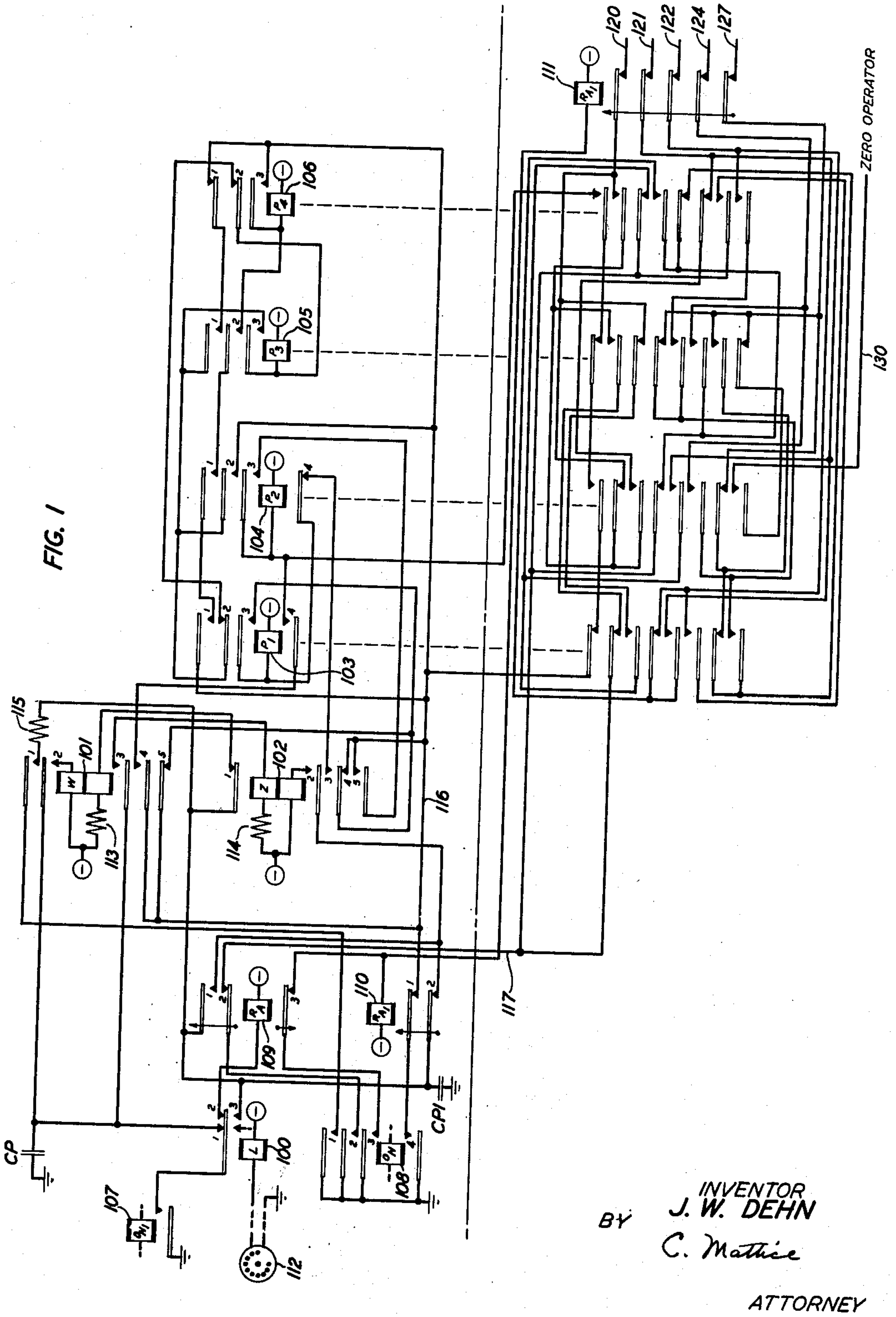
Figure 2:
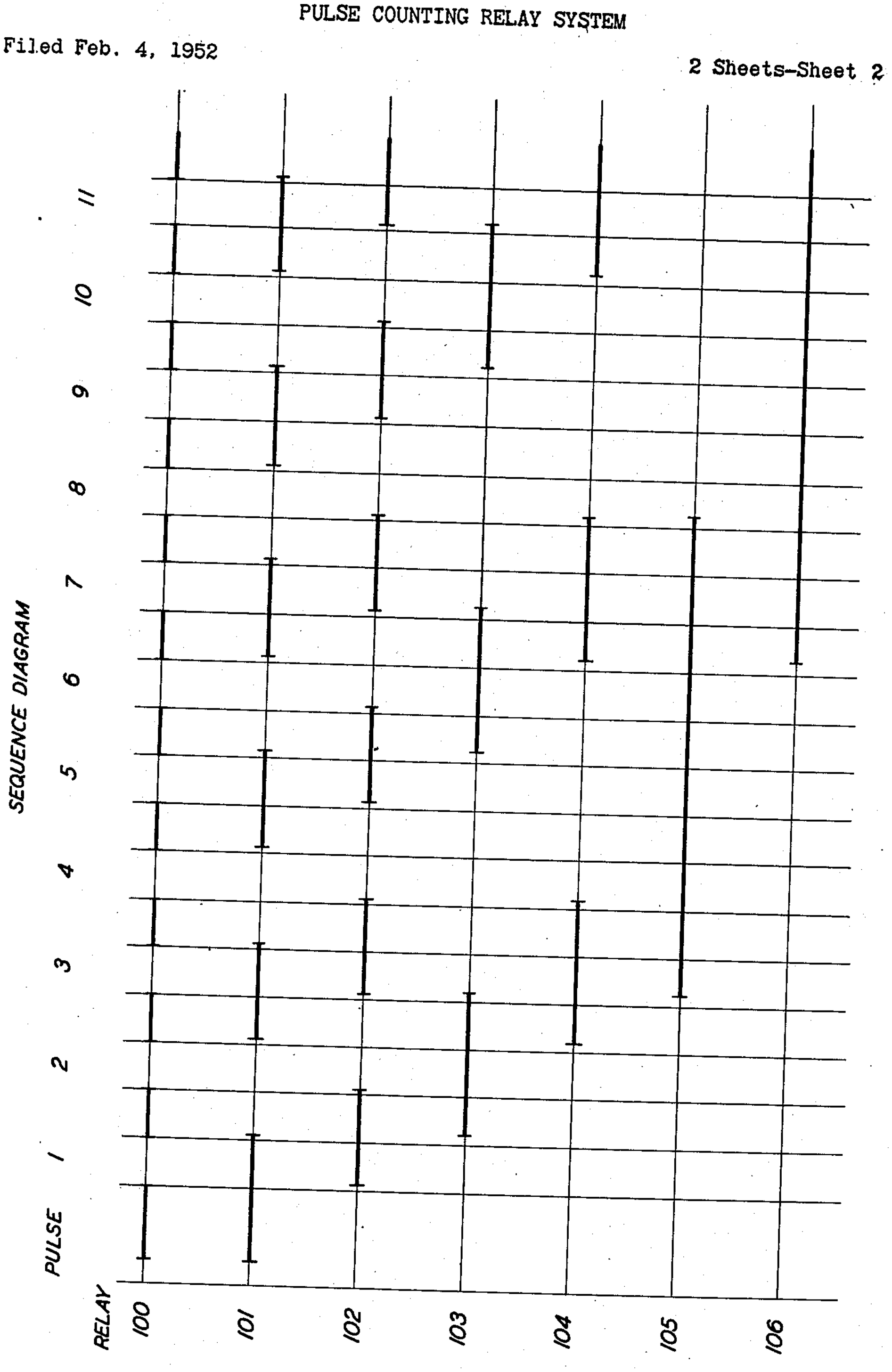

The invention will be more clearly understood from a consideration of the following description in connection with the attached drawing, in which:

Fig. 1 shows the counting relay arrangement of the invention as it might be employed in an originating register such as used in the cross-bar system disclosed in Patent No. 2,585,904 to A. J. Busch, granted February 19, 1952, and Fig. 2 is a sequence diagram showing the times during which the various relays are operated with respect to the open pulse periods.

In the drawing, relay 100 is the pulse receiving relay, relays 101 and 102 constitute the driving binary counter, relays 103 and 104 constitute the counting binary counter and relays 105 and 106 are the marking relays. In addition, two off-normal relays 107 and 108 and three registration advance relays 109, 110 and 111 are shown which are standard parts of the above-mentioned cross-bar system.

In such a telephone system the origination of a call by a subscriber causes the automatic establishment of a connection between the calling subscriber's line and the pulse receiving relay 100 in the originating register, including the dial 112 at the calling substation. As a part of setting up this connection, off-normal relays 107 and 108 are operated. Relay 100 operates as soon as it is connected with the calling line, closing a circuit from ground over a contact of off-normal relay 107, contact 3 of relay 100, contact 1 of relay 102 through the lower winding of relay 101 and resistance 113 to battery. Relay 101 operates in this circuit and locks in a circuit from battery through resistance 113, lower winding of relay 101, contact 1 of relay 102, resistance 115, contact 1 of relay 101 to ground at contact 1 of off-normal relay 108. With off-normal relay 108 operated a circuit is closed over its contact 3, contact 3 of relay 109 to battery through the windings of relays 110 and 111, operating the latter relays. The circuit remains in this condition until the subscriber operates his dial. As the dial returns to normal it opens the circuit of relay 100 a plurality of times in the well-known manner.

At the first interruption relay 100 opens its contact 3, thereby opening the operating circuit of relay 101. When relay 100 closes its contact 1, it completes a locking circuit for relay 101, which may be traced from battery through the upper winding of relay 101, contact 2 of relay 101, contact 1 of relay 100 to ground at the contact of relay 107. At the same contact it closes an operating circuit for relay 102 which may be traced from battery through resistance 114, upper winding of relay 102, contact 3 of relay 101, contact 1 of relay 100 to ground through the contact of relay 107.

Relay 100 also closes a circuit from ground at the contact of relay 107 over its contact 2 to battery through the winding of relay 109. This relay operates quickly but is slow to release so that it remains operated throughout the reception of each digit. At its contact 3 it opens the circuit of relays 110 and 111 so that these relays release and remain released throughout the reception of each digit. With relay 109 operated and relay 110 released, an auxiliary locking circuit is closed for relay 102 which may be traced from battery through the lower winding of relay 102, contact 2 of that relay, over contact 1 of relay 109 and contact 2 of relay 110 in parallel, resistance 115, contact 1 of relay 101 to ground at contact 1 of off-normal relay 108. Relay 102, at its contact 1 opens the operating and auxiliary locking circuits for relay 101.

At the end of the first pulse, relay 100 reoperates, opening its contacts 1 and 2 and closing its contact 3. The opening of contact 1 opens the locking circuit for relay 101 which releases. The opening of contact 2 breaks the operating circuit of relay 109, but as above mentioned that relay is slow to release and holds operated. At contact 3 relay 100 closes the locking circuit for relay 102 which may be traced from battery through the lower winding and over contact 2 of relay 102, contact 2 of relay 110, contact 3 of relay 100 to ground at the contact of relay 107. The release time of relay 101 is greater than the transfer time of relay 100 and relay 102 is, therefore, held operated during the closed period of the dial over the auxiliary locking circuit previously traced.

At the second open period of the dial, relay 100 again releases, in turn releasing relay 102. Relays 101 and 102 are, therefore, both released. During the next closed period of the dial relay 101 is reoperated and held as above-described and during the third open period, relay 102 is operated.

Therefore, during each odd numbered impulse, relays 101 and 102 are both operated and during each even numbered impulse both relays are released.

While the dial contact is closed between an odd and an even pulse, relay 102 is operated alone; while the dial contact is closed between an even and an odd pulse, relay 101 is operated alone.

Relays 103 and 104 also constitute a binary counter and are operated under the control of relays 101 and 102.

When the dial recloses after the first pulse, at which time relay 102 is operated and relay 101 released, a circuit is closed from ground over contact 4 of relay 108, contact 1 of relay 110, conductor 116, contact 5 of relay 101, contact 3 of relay 102, contact 4 of relay 104 to battery through the winding of relay 103. Relay 103 operates and locks over its contact 3, contact 5 of relay 101, to ground on conductor 116. When relay 102 releases at the beginning of the second pulse a parallel locking circuit is closed at contact 4 of relay 102 so that relay 103 remains operated until relay 102 is reoperated at the beginning of the third pulse.

When the dial recloses after the second pulse, at which time relay 101 is operated, relay 102 released and relay 103 held operated, a circuit is closed from ground on conductor 116, contact 4 of relay 101, contact 4 of relay 103 to battery through the winding of relay 104. Relay 104 operates in this circuit. When relay 102 operates at the opening of the dial for the third pulse, relay 104 locks in a circuit from battery through its winding and over its contact 3, contact 5 of relay 102, to ground on conductor 116. Therefore, relay 104 remains operated until relay 102 releases at the beginning of the fourth pulse.

Relay 103 is reoperated at the end of the fifth pulse, and is held locked as above described to the beginning of the seventh pulse, while relay 104 is operated at the end of the sixth pulse and held locked until the beginning of the eighth pulse. Similarly, relay 103 is reoperated at the end of the ninth pulse and relay 104 is reoperated at the end of the tenth pulse. If a false eleventh pulse should be received, relay 102 would reoperate at the beginning of that pulse and release 103. At the end of the eleventh pulse relay 101 releases.

The marking relays 105 and 106 are operated under the control of relays 103 and 104. At the beginning of the third pulse, at which time relay 103 releases and relay 104 is held operated, a circuit is closed from ground on conductor 116, contact 2 of the relay 104, contact 2 of relay 103, contact 2 of relay 106 to battery through the winding of relay 105. Relay 105 operates in this circuit and locks in a circuit from battery through its winding and over its contact 3, contact 2 of relay 104 to ground on conductor 16. It also closes a second locking circuit from battery through its winding and over its contacts 3 and 1 and contact 1 of relay 106 to ground on conductor 116, by which relay 105 is held operated during the released period of relay 104.

When relay 104 reoperates at the end of the sixth pulse, at which time relays 103 and 105 are held operated, a circuit is closed from ground on conductor 116, contact 1 of relay 103, contact 1 of relay 104, contact 2 of relay 105 to battery through the winding of relay 106. Relay 106 operates in this circuit and locks over its contact 3 directly to ground on conductor 116, therefore remaining operated until the end of the digit. Relay 106 opens the second locking circuit of relay 105, but the latter relay is held operated over its first locking circuit under the control of relay 104 until the beginning of the eighth pulse, at which time it releases.

The foregoing operations may be more clearly visualized by reference to the sequence diagram of Fig. 2, wherein the start and end of each pulse is indicated by light vertical lines and the time, during which each of the relays 100 to 106 is operated, is indicated by heavy horizontal lines.

Whenever the digit ends, relay 100 remains operated for a sufficient time to permit relay 109 to release and reoperate relays 110 and 111. With relay 109 released, ground is connected over contact 2 of relay 108 and contact 2 of relay 109 to conductor 117, which is extended over contacts of relays 103 to 106 to conductors 120, 121, 122, 124 and 127 in accordance with the two-out-of-five code as shown in the table shown hereinafter. Relays 110 and 111 are slow to operate and ground is extended over the normally closed contacts of relay 111 to the digit register only during its operate time so that when the locking circuits for the operated counting relays are opened by relay 110, no false registration can take place if the counting relays do not release simultaneously. The operation of relay 103 only at the end of the first pulse gives the steering relay in the digit register circuit additional time to open the registering circuits at that point.

The non-symmetrical operation of relays 105 and 106 provides twelve unique combinations of the relays 103, 104, 105 and 106. Ten of these combinations serve to distinguish one to ten dial pulses and a translating circuit over the contacts of relays 103, 104, 105 and 106, shown at the bottom of the figure, grounds two out of the five conductors 120, 121, 122, 124 and 127 during the interdigital time to correspond to the dialed digit. With none of the relays operated, none of the registering conductors are grounded and none of them are connected to any other. If an eleventh pulse is received a circuit is immediately closed which holds relay 104 operated and results in a trouble indication by the originating register.

When the digit zero is received, in addition to the coded indication of the digit zero, a special circuit is closed to ground conductor 130 which may be used by the originating register in setting up a call to the zero operator when this is the first digit dialed.

Following is a table showing the relays operated and the conductors grounded for each digit dialed:

| Digit | Relays Operated | Conductors Grounded |
|---|---|---|
| 1 | 103 | 120, 121 |
| 2 | 103, 104 | 120, 122 |
| 3 | 104, 105 | 121, 122 |
| 4 | 105 | 120, 124 |
| 5 | 103, 105 | 121, 124 |
| 6 | 103, 104, 105, 106 | 122, 124 |
| 7 | 104, 105, 106 | 120, 127 |
| 8 | 106 | 121, 127 |
| 9 | 103, 106 | 122, 127 |
| 10 | 103, 104, 106 | 124, 127 |
| 11 | 104, 106 | ---------- |

What is claimed is:

1. In a pulse counting arrangement, a pulse responsive relay having an armature and two contacts, one of said contacts closed only when said pulsing relay is energized and the other of said contacts closed only when said pulsing relay is deenergized, a first pair of relays constituting a binary counter, each of said pair of relays having an operating circuit closed by one of said contacts, a locking circuit closed by the other of said contacts and a supplementary locking circuit effective to hold said relay operated when neither of said contacts is closed, a second pair of relays constituting a second binary counter, each of second pair of relays having an operating circuit controlled by one of said first pair of relays and a locking circuit controlled by the other one of said first pair of relays, and a pair of marking relays operated under the control of said second binary counter, said second binary counter and said marking relays being operated in unique combinations to count a maximum of eleven pulses.

2. In a pulse counting arrangement, a pulse responsive relay having an armature and two contacts, one of said contacts closed only when said pulsing relay is energized and the other of said contacts closed only when said pulsing relay is deenergized, a first pair of relays constituting a binary counter, each of said pair of relays having an operating circuit closed by one of said contacts, a locking circuit closed by the other of said contacts and a supplementary locking circuit effective to hold said relay operated when neither of said contacts is closed, a second pair of relays constituting a second binary counter, each of said second pair of relays having an operating circuit controlled by one of said first pair of relays and a locking circuit controlled by the other one of said first pair of relays, a pair of marking relays operated under the control of said second binary counter, said second binary counter and said marking relays being operated in unique combinations to count a maximum of eleven pulses, and circuits closed by the two relays of said second binary counter and said marking relays in ten of said combinations to indicate the corresponding digit.

3. In a pulse counting arrangement, a pulse responsive relay having an armature and two contacts, one of said contacts closed only when said pulsing relay is energized and the other of said contacts closed only when said pulsing relay is deenergized, a first pair of relays constituting a binary counter, each of said pair of relays having an operating circuit closed by one of said contacts, a locking circuit closed by the other of said contacts and a supplementary locking circuit effective to hold said relay operated when neither of said contacts is closed, a second pair of relays constituting a second binary counter, each of said second pair of relays having an operating circuit controlled by one of said first pair of relays and a locking circuit controlled by the other one of said first pair of relays, a pair of marking relays operated under the control of said second binary counter, said second binary counter and said marking relays being operated in unique combinations to count a maximum of eleven pulses, and circuits closed by the two relays of said second binary counter and said marking relays independent of said first binary counter in ten of said combinations to indicate the corresponding digit.

4. In a pulse counting arrangement, a pulse responsive relay having an armature and two contacts, one of said contacts closed only when said pulsing relay is energized and the other of said contacts closed only when said pulsing relay is deenergized, a first pair of relays constituting a binary counter, each of said pair of relays having an operating circuit closed by one of said contacts, a locking circuit closed by the other of said contacts and a supplementary locking circuit effective to hold said relay operated when neither of said contacts is closed, a second pair of relays constituting a second binary counter, each of said second pair of relays having an operating circuit controlled by one of said first pair of relays and a locking circuit controlled by the other one of said first pair of relays, a pair of marking relays operated under the control of said second binary counter, said second binary counter and said marking relays being operated in unique combinations to count a maximum of eleven pulses, and pairs of circuits closed by the two relays of said second binary counter and said marking relays independent of said first binary counter in ten of said combinations to set up a code indication of the corresponding digit.

5. In a pulse counting arrangement, a pulse responsive relay having an armature and two contacts, one of said contacts closed only when said pulsing relay is energized and the other of said contacts closed only when said pulsing relay is deenergized, a first pair of relays constituting a binary counter, each of said pair of relays having an operating circuit closed by one of said contacts, a locking circuit closed by the other of said contacts and a supplementary locking circuit effective to hold said relay operated when neither of said contacts is closed, a second pair of relays constituting a second binary counter, each of said second pair of relays having an operating circuit controlled by one of said first pair of relays and a locking circuit controlled by the other one of said first pair of relays, a pair of marking relays operated under the control of said second binary counter, said second binary counter and said marking relays being operated in unique combinations to count a maximum of eleven pulses, pairs of circuits closed by the two relays of said second binary counter and said marking relays independent of said first binary counter in ten of said combinations to set up a code indication of the corresponding digit, and an auxiliary circuit closed by said second binary counter and said marking relays to directly indicate the digit zero 6 In a pulse counting arrangement, a pulse responsive relay having an armature and two contacts, one of said contacts closed only when said pulsing relay is energized and the other of said contacts closed only when said pulsing relay is deenergized, a first pair of relays constituting a binary counter, each of said pair of relays having an operating circuit closed by one of said contacts, a locking circuit closed by the other of said contacts and a supplementary locking circuit effective to hold said relay operated when neither of said contacts is closed, a second pair of relays constituting a second binary counter, each of said second pair of relays having an operating circuit controlled by one of said first pair of relays and a locking circuit controlled by the other one of said first pair of relays, a pair of marking relays operated under the control of said second binary counter, said second binary counter and said marking relays being operated in unique combinations to count a maximum of eleven pulses, pairs of circuits closed by the two relays of said second binary counter and said marking relays independent of said first binary counter in ten of said combinations to set up a code indication of the corresponding digit, and an additional circuit closed by said second binary counter and said marking relays in said eleventh combination to prevent the further operation of said second binary counter.

7. In a pulse counting arrangement, a pulse responsive relay having an armature and two contacts, one of said contacts closed only when said pulsing relay is energized and the other of said contacts closed only when said pulsing relay is deenergized, a first pair of relays constituting a binary counter, each of said pair of relays having an operating circuit closed by one of said contacts, a locking circuit closed by the other of said contacts and a supplementary locking circuit effective to hold said relay operated when neither of said contacts is closed, a second pair of relays constituting a second binary counter, each of said second pair of relays having an operating circuit controlled by one of said first pair of relays and a locking circuit controlled by the other one of said first pair of relays, a pair of marking relays operated under the control of said second binary counter, said second binary counter and said marking relays being operated in unique combinations to count a maximum of eleven pulses, pairs of circuits closed by the two relays of said second binary counter and said marking relays independent of said first binary counter in ten of said combinations to set up a code indication of the corresponding digit, an auxiliary circuit closed by said second binary counter and said marking relays to directly indicate the digit zero, and an additional circuit closed by said second binary counter and said marking relays in said eleventh combination to prevent the further operation of said second binary counter.

References Cited in the file of this patent

UNITED STATES PATENTS

| Number | Name | Date |
|---|---|---|
| 2,067,145 | Powell | Jan. 5, 1937 |
| 2,241,156 | Powell | May 6, 1941 |
| 2,600,729 | Boyer | June 17, 1952 |